Feb. 6, 1945.   M. F. BATES   2,368,628
OBJECT CONTROLLING MEANS
Filed Oct. 27, 1942
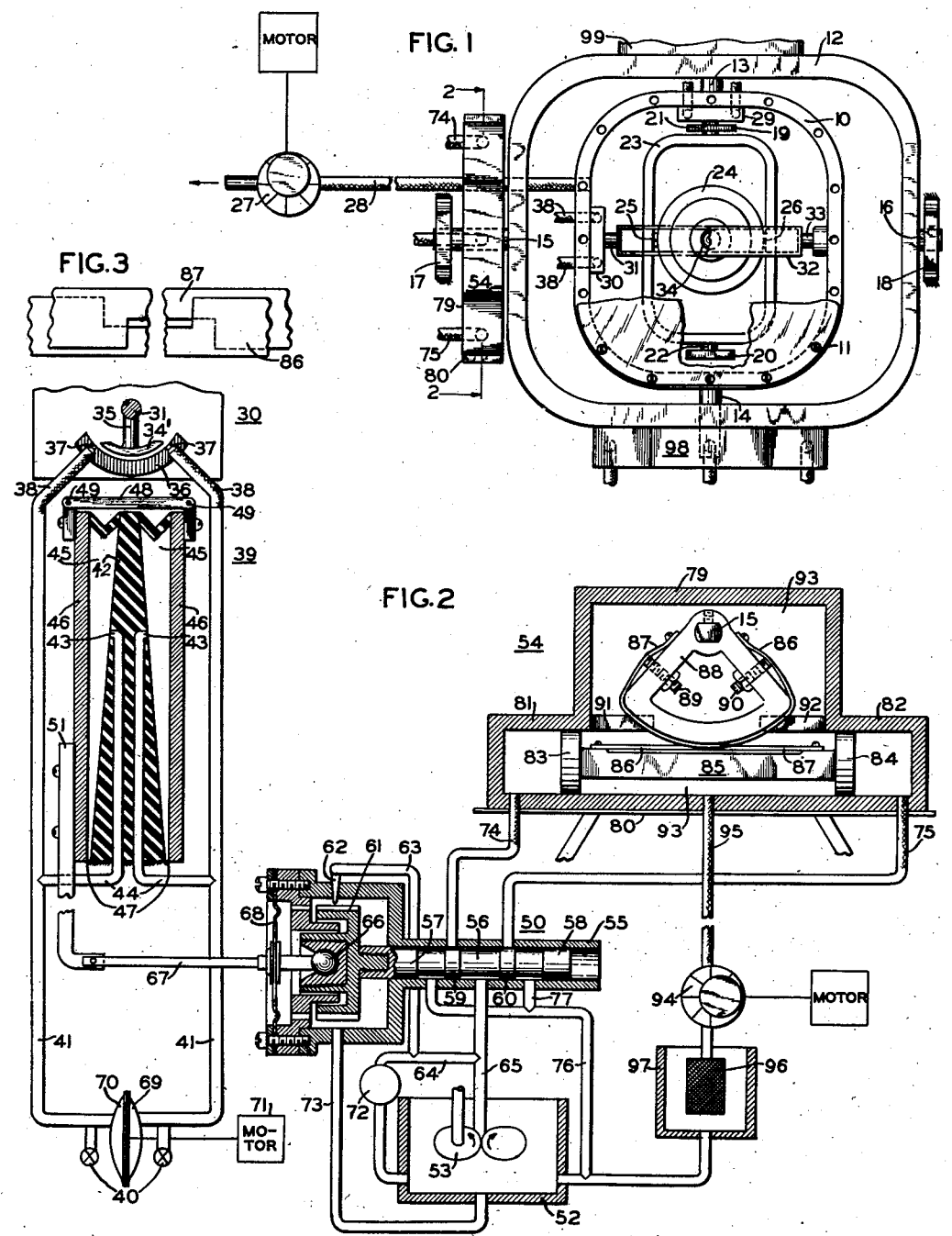
INVENTOR
M. F. BATES
BY
Herbert H. Thompson
his ATTORNEY.

Patented Feb. 6, 1945

2,368,628

UNITED STATES PATENT OFFICE 2,368,628

OBJECT CONTROLLING MEANS

Mortimer F. Bates, Brooklyn, N. Y., assignor to Sperry Gyroscope Company, Inc., Brooklyn, N. Y., a corporation of New York Application October 27, 1942, Serial No. 463,565

8 Claims. (Cl. 121—46.5)

This invention relates generally to an object controlling means. More particularly the invention pertains to a follow-up system by which a controlled object such as a platform providing casing is stabilized with respect to a gyro vertical instrument of conventional construction.

An object of the invention is to employ a differential control valve in the hydraulic portion of the follow-up system in which static friction is overcome.

One of the features of the invention resides in provision of a self-centering pneumatic relay of the bellows type.

Another feature of the invention consists in provision of a hydraulically operated impulse turbine for rotating the valve stem of the control valve of the hydraulic system.

Still a further feature of the invention resides in the mounting arrangement of the combined gyro vertical instrument and platform providing casing.

Another feature of the invention consists in the provision of a dual control for the relay by which the valve stem of the valve of the hydraulic system is both differentially controlled and oscillated.

Other features and structural details of the invention will be apparent from the following description when read in relation to the accompanying drawing, wherein, Fig. 1 is a plan view of a gyro stabilized platform connected in accordance with the present invention.

Fig. 2 is a diagrammatic view showing the novel follow-up system by which the platform in the present instance is stabilized with relation to the gyro instrument, and Fig. 3 is a detail plan view showing the adjacent cut-out portions of the crossing straps utilized in the servomotor.

With reference to Fig. 1, the controlled object of the present invention is constituted of a platform providing casing 10. The platform 11 is fixedly mounted on the top of the hollow casing 10 and is situated in a horizontal plane. Casing 10 is universally mounted by means of gimbal ring 12. The minor axis of universal mounting of the platform providing casing being provided by trunnions 13 and 14 that extend from the casing and suitable bearings therefor in the opposite arms of the ring 12. The major axis of the casing is provided by the trunnions 15 and 16 of the ring 12 with suitable bearings therefor in the upwardly extending opposite arms of a fixedly mounted yoke or base. Such arms are respectively indicated at 17 and 18.

A gyro vertical instrument is shown mounted within the hollow platform providing casing on a yoke which is fixed to the base of the casing 10. The upwardly extending arms of the yoke as indicated at 19 and 20 have bearings which receive the trunnions 21 and 22 of the gimbal ring 23 by which the rotor bearing case of the gyro instrument is universally mounted. The gimbal rings are arranged in perpendicular relation so that the major axis of the gyro rotor case is coaxial with the minor axis of the platform providing casing. The gyro rotor case 24 is pivotally mounted on the ring 23 by means such as the oppositely extending trunnions 25 and 26 with suitable bearings therefor in the opposite arms of the gimbal ring 23. Due to the arrangement of the rings, the minor axis of the gyro instrument and the major axis of the platform providing casing are normally situated in coaxial relation. The gyro rotor case 24 shown is of conventional form and includes a gyro rotor (not shown) which is suitably spun about a normally vertical axis. Any suitable method may be employed to maintain the rotor bearing case 24 in an erected condition. As shown in Fig. 1, the enclosed platform providing casing 10 is continuously evacuated by means of a pump 27 which draws air therefrom by way of the flexible hose 28. Air may be suitably admitted to the gyro instrument in the present instance by way of a filter (not shown) in the base of the casing 10 and may be employed in a conventional way to both spin the gyro rotor and maintain the rotor case erect before passing into the hollow enclosing casing 10 from which it is continuously withdrawn.

Two pick-offs as generally indicated at 29 and 30 are employed to detect relative displacement of the platform providing casing 10 and the gyro vertical about their respective axes. As shown in Fig. 1, trunnion 21 of the ring 23 of the gyro instrument extends into the pick-off 29 and is adapted to position one of the parts thereof. One of the elements of pick-off 30 is positioned by the trunnion 31 which moves with a pivotally mounted bail 32. The other trunnion for bail 32 is indicated at 33. Trunnions 31 and 33 are journaled in suitable bearings in the casing 10. Bail 32 is engaged by a roller 34 on the top of the rotor bearing case 24 which moves with movement of the case about its minor axis to correspondingly effect the part of the pick-up mounted on trunnion 31.

The pick-off and follow-up control system for each of the mutually perpendicular axes of case 24 and platform casing 10 are similar in construction, so in order to avoid repetition only the follow-up control system responsive to angular displacement between the minor axis of the gyro vertical and the major axis of the platform casing will be described in detail. A single hydraulic pump is usually employed for the respective hydraulic systems in the follow-up control which in this instance is considered applicable for only the particular system under consideration.

With reference to Fig. 2, the pick-off 30 is indicated in detail. The element of the pneumatic pick-off positioned by the gyro vertical instrument or by case 24 is constructed in the form of a segmental plate 34' having oppositely disposed knife edge portions at the respective ends of the same. A radial arm 35 connects plate 34' to the trunnion 31 of the gyro case positioned bail 32. The other element of pick-off 30 is a curved plate 36 which is secured to the inner wall of platform providing casing 10. Plate 36 is concentrically located with respect to plate 34 and includes two radially projecting spaced nozzle providing openings 37. Air is supplied the nozzles by way of the flexible tubing 38 which is fastened to the exterior wall of the casing 10. Pump 27 which operates to continuously withdraw air from the casing 10 also draws air through the respective nozzle openings 37 of the pick-off. It will be understood that when the relative parts of the pick-off are normally positioned, the knife edge positions of the plate 34' bisect the air jets issuing from the respective nozzles 37. When relative angular displacement of the elements occurs, one or the other of the nozzles is blocked to a greater degree. Air is consequently evacuated to a greater extent from the relatively unblocked tubing. The differential pressure change in the air flowing in the respective tubes is employed to control a pneumatic relay generally indicated at 39. Air is supplied the pick-off by way of air bleeds 40 and the respective pipes 41 which are suitably joined to the flexible tubing 38 for each of the nozzles.

The improved pneumatitc relay as shown in Fig. 2 is a differentially operable bellows type unit having a fixedly mounted central dividing wall 42. In the form of bellows unit shown, the dividing wall 42 is wedge-shaped and the base of the wall is suitably held in a stationary position. Passageways 43 are situated in the wall 42 leading to the respective sides thereof. Each of the passageways is connected to one of the pipes 41 by way of pipes 44. The bellows type pneumatic relay also includes a flexible cover 45 and two oppositely disposed rigid end walls 46 which are hingedly mounted on the central wall 42 as indicated at 47. Spacing means in the form of a link 48 connects the respective end walls 46, the link being shown as extending over the apex of the wedge-shaped center wall 42. The respective ends of the link 48, which is of fixed length, are pivotally connected as indicated at 49 to the oppositely disposed end walls 46. Movement of the linked end walls of the relay about the hinged mounting thereof at the base of the fixed wall of the relay is communicated to a relay valve generally indicated at 50 controlling a hydraulic system by way of arm 51 which is fixed to one of the end walls 46. In operation, the relay 39 is responsive to a differential change in pressure in pipes 41 by the action of pick-off 30 so that the end walls 46 thereof rock about hinge axis 47 either in a clockwise or counter-clockwise direction as viewed in Fig. 2. Assuming that motion of the relay walls 46 has occured in a clockwise direction, it will be understood that the right-hand portion, Fig. 2, of the pleated cover 45 has expanded while the left-hand portion of the cover 45 has correspondingly contracted. The increase in area of the portions of the bellows on which atmospheric pressure is effective results in a correspondingly increasing force tending to resist the movement of the end walls of the bellows. This force is effective whenever the relay departs from a normally balanced position, as shown in Fig. 2, and is sufficient to render the unit self-centering.

The hydraulic system of the follow-up control for the pick-off 30, in addition to the control valve 50, includes a fluid containing sump 52, a gear type pump 53 which is driven in any suitable manner, and a servomotor generally indicated at 54. The control valve 50 as shown diagrammatically in Fig. 2 includes a valve casing 55 in which a valve stem or control member 56 is situated having oppositely disposed end piston forming elements 57 and 58 and intermediate spaced piston forming elements 59 and 60. On one end of the valve stem 56 is mounted the turbine wheel 61 of a hydraulically operable impulse turbine. Wheel 61 is coaxial in the present instance with the longitudinal axis of the valve stem 56. The nozzle 62 of the turbine is located in the valve casing 55, the same directing fluid upon the wheel 61 to spin the valve stem about its longitudinal axis. Fluid under pressure is supplied the nozzle 62 by way of pipes 63, 64 and 65 from the discharge side of the pump 53. The wheel 61 and valve stem move together translationally to control the hydraulic system's valve part by means of a ball and socket joint 66 between the same and an arm 67 which is pivotally connected to control arm 51 of the pneumatic relay 39. The relay 39 is linked mechanically to move the control member 56 of the valve translationally without lost motion. A diaphragm connection 68 of thin flexible material permits relative translational movement of the valve stem 56 to occur with respect to the casing 55, the same closing the open end of the valve and preventing the escape of fluid therefrom to the exterior. The valve stem 56 is consequently mounted for both translating controlling movement by way of the pneumatic relay and rotating movement by means of the turbine wheel. The continuous rotating movement of the valve stem 56 obviates static friction therein and consequently makes the same more sensitive in exerting control over the hydraulic system.

Means may be also included in the system for oscillating the valve stem 56 along its translational axis. Such means as shown in the present instance is exerted by controlling the pneumatic relay 39 and may include a housing 69 having a flexible diaphragm 70 therein. The ends of the respective pipes 41 lead into the areas on the opposite sides of the diaphragm 70 which is oscillated in a suitable manner by means such as a motor 71. This results in a small vibrating action of the relay 39 which is superimposed on the differential control pressure signal provided the system by the pick-off 30. When the oscillatory diaphragm 70 is employed, the same provides a means for controlling the relay 39 to cause continuous translational oscillation of the control member of the valve. Such means is simultaneously effective with the pick-off means 30 in influencing the translational movement of the valve stem 56 provided for controlling the valve through the relay. Relay 39 is operated at all times by the oscillation causing means 69—70 whose signal is continuously superimposed on the signal of the pick-off 30, whether or not the plate 34' thereof is in a central position. Pick-off 30 is not disabled at any time, the same performing the function of a control means for the relay 39 to cause translational movement of the valve mechanism. The simultaneously effective means for controlling the relay to cause continuous translational oscillation of the valve mechanism is the means indicated at 69—70.

The fluid pressure inlet port of the control valve is supplied by pipe 65. This port is situated midway between the spaced intermediate pistons 59 and 60 when the same are situated in a normal valve closing position. Pipe 64 connected to pipe 65 includes a suitable pressure relief valve generally indicated at 72 which returns fluid directly to the sump 52. A pipe 73 provides for the gravity return of fluid discharged from nozzle 62 and contained within the turbine wheel receiving part of the valve casing 55 to the sump 52. The discharge ports of the valve 55 lead to the servomotor 54 by way of flexible tubing 74 and 75. The return ports of the valve 55 lead by way of pipes 76 and 77 to the sump 52. In operation, the differentially effective valve stem 56 moves translationally to uncover one of the discharge ports and simultaneously renders the opposite return port effective. For example, if stem 56 moves to the right, as viewed in Fig. 2, piston 60 uncovers the discharge port leading to tubing 75 permitting the fluid to flow into the tubing 75 to operate the servomotor. At the same time, piston 59 moves to the right correspondingly to open communication between the discharge port for tube 74 and the return port for pipe 76 facilitating the return of fluid in this portion of the system back to the sump 52.

The casing for the servomotor 54 for moving the platform providing casing 10 by means of the gimbal ring 12 is indicated at 79. Casing 79 is mounted on a suitable platform 80 and includes two oppositely disposed coaxially arranged cylinder defining portions 81 and 82 in which individual pistons 83 and 84 are movable. Tubes 74 and 75 are respectively connected to the servomotor to supply fluid to the opposed cylinders. Pistons 83 and 84 are provided with a common connecting member 85 on which one end of two slotted steel tapes as indicated at 86 and 87 is secured. Tapes 86 and 87 extend in crossed relation as shown in Fig. 3 around the peripheral portion of a sector 88 which is fixedly mounted on the trunnion 15 of the ring 12 which projects within the casing 79 of servomotor 54. The opposite ends of the tapes are suitably fixed to the sector. Screws 89 and 90 are provided on the sector for adjusting the tension in the respective steel tapes 86 and 87. Consequently, motion of the pistons is directly communicated to the trunnion 15 without back lash between the connected parts. Each of the cylinders of the servomotor has an axial slotted portion, as indicated at 91 and 92, in which the sector 88 moves. Slots 91 and 92 also provide a pressure relief for the servomotor when movement of either of the pistons 83 and 84 has taken place to an extent which renders the slots effective. A common pressure relief chamber for the respective cylinders is provided within the casing 79 as indicated at 93. The fluid in the pressure relief chamber 93 is continuously scavenged by means of a pump 94 and a flexible tubing 95 which leads to the chamber. Fluid is pumped by this means to a suitable filter 96 and secondary sump 97 from which it returns to the main sump 52 by means of gravity.

The servomotor for the other axis of the gyro stabilized platform is similarly constructed, the same however being directly mounted on the ring 12 by which through means of trunnion 14 it directly positions the casing 10. This servomotor is generally indicated at 98. In the present instance, a counterbalance for the ring mounted servomotor is indicated at 99, in Fig. 1. This result may also be obtained by off-setting the gimbal ring 23 from its indicated central position with relation to the stabilized casing 10. In operation, the servomotors position the casing 10 both directly by servomotor 98 and indirectly by servomotor 54 to cancel the pick-off signal produced by occurrence of relative angular displacement between the parts detected by the pick-offs 29 and 30. The effect of the oscillatory movements of the valve stem 56 under control of means 69—70 is not reflected in the operation of the servomotor.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed is:

1. The combination with a servomotor controlling valve mechanism having a translatable and rotatable control member of, means for continuously rotating said member, a differentially operable relay directly connected to said control member to move the same translationally, means for controlling said relay, and simultaneously effective means for controlling said relay to cause continuous translational oscillation of said member.

2. A mechanism of the character claimed in claim 1, in which the relay is connected to the control member by a mechanical linkage.

3. A mechanism of the character claimed in claim 1, in which the servomotor controlled by the valve mechanism is hydraulic and the rotating means for the control member of the mechanism is a hydraulically operated impulse turbine.

4. A mechanism of the character claimed in claim 1, in which the relay is pneumatic and the same is responsive to the combined influence of the respective controlling means therefor.

5. The combination with a hydraulic servomotor controlling valve mechanism having a translatable and rotatable control member of, means for continuously rotating said member, a differentially operable pneumatic relay linked mechanically to move the control member translationally without lost motion, means for controlling said relay to cause the member to move translationally, and simultaneously effective means for controlling said relay to cause continuous translational oscillation of the member.

6. The combination with a servomotor controlling valve mechanism having a translatable control member, a relay connected to said control member to move the same without lost motion, means for operating said relay to cause the member to move translationally, and simultaneously effective means for operating said relay to cause continuous translational oscillation of the member.

7. A valve mechanism having a translatable control member, a relay for actuating said control member without lost motion, means for operating said relay to cause the member to move translationally, and simultaneously effective means for operating said relay to cause continuous translational oscillation of the member.

8. A valve mechanism of the character claimed in claim 7, in which the control member is rotatably mounted, and which includes means for continuously rotating the control member.

MORTIMER F. BATES.